United States Patent
Rosenfellner

(10) Patent No.: US 6,210,631 B1
(45) Date of Patent: Apr. 3, 2001

(54) REDUCTION VESSEL FOR THE REDUCTION OF METAL-OXIDE-BEARING MATERIAL

(75) Inventor: Gerald Rosenfellner, St. Peter/Au (AT)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 09/205,859

(22) Filed: Dec. 4, 1998

(30) Foreign Application Priority Data

Dec. 5, 1997 (AT) .................................................. 2073/97

(51) Int. Cl.[7] .................................................. C21B 13/02
(52) U.S. Cl. ........................... 266/144; 266/156; 266/195
(58) Field of Search .................................. 266/195, 144, 266/156

(56) References Cited

U.S. PATENT DOCUMENTS

| | | | |
|---|---|---|---|
| 3,836,131 | 9/1974 | Beggs | 266/20 |
| 3,850,616 | 11/1974 | Cruse, Jr. | 75/34 |
| 4,032,120 | 6/1977 | Beggs | 266/159 |
| 4,046,557 | 9/1977 | Beggs | 75/35 |
| 4,205,831 | * 6/1980 | Vera et al. | 266/195 |
| 4,212,452 | 7/1980 | Hsieh | 266/156 |
| 4,248,626 | 2/1981 | Scarlett et al. | 75/38 |
| 4,270,740 | 6/1981 | Sanzenbacher et al. | 266/157 |
| 4,735,653 | * 4/1988 | Mathews | 75/496 |
| 5,618,032 | * 4/1997 | Meissner et al. | 266/80 |

FOREIGN PATENT DOCUMENTS

| | | |
|---|---|---|
| 328481 | 3/1976 | (AT) . |
| 2651309 | 5/1977 | (DE) . |
| 3432090 | 3/1986 | (DE) . |

* cited by examiner

Primary Examiner—Melvyn Andrews
(74) Attorney, Agent, or Firm—Ostrolenk, Faber, Gerb & Soffen, LLP

(57) ABSTRACT

The invention relates to a reduction vessel (1) for the reduction of metal-oxide-bearing material, particularly of iron ore, by means of a reduction gas flowing countercurrently to the metal-oxide-bearing material, which reduction vessel (1) is provided with an inlet (5) for the metal-oxide-bearing material, an inlet (6) for the reduction gas, an outlet (7) for off-gas and an outlet (8) for reduced material, downstream of which outlet (8) a lower sealing leg (9) is connected, a supply line (10) for a first sealing gas being provided at the lower sealing leg (9) in order to seal the reduction vessel (1) against the environment, characterized in that at least one additional supply line (12) for an additional sealing gas is provided at the lower sealing leg (9), the additional supply line (12) being located downstream of the supply line (10) for the first sealing gas, seen in the direction of flow of the reduced material (FIG. 1).

6 Claims, 3 Drawing Sheets

US 6,210,631 B1

REDUCTION VESSEL FOR THE REDUCTION OF METAL-OXIDE-BEARING MATERIAL

BACKGROUND OF THE INVENTION

1. Field of the Invention

The invention relates to a reduction vessel for the reduction of metal-oxide-bearing material, particularly of iron ore, by means of a reduction gas flowing countercurrently to the metal-oxide-bearing material, which reduction vessel is provided with an inlet for the metal-oxide-bearing material, an inlet for the reduction gas, an outlet for off-gas and an outlet for reduced material, downstream of which outlet a lower sealing leg is connected, a supply line for a first sealing gas being provided at the lower sealing leg in order to seal the reduction vessel against the environment. The invention further relates to a process for sealing a reduction vessel for the reduction of metal-oxide-bearing material, particularly of iron ore.

2. Description of the Related Art

Arrangements for sealing a reduction vessel against the environment are known (Direct from Midrex, Vol. 14, No. 3, 3rd quarter of 1989).

According to DE-A-34 32 090, sulfur-bearing ore is reduced in a shaft furnace in counterflow with reduction gas. The off-gas exiting the furnace is divided into two flows, the first flow being used for preheating and desulfurization of the ore which is located in a ore bin above the shaft furnace and the second flow being fed to a catalytic gas converter together with hydrocarbons in order to generate reduction gas.

Above the ore bin of the arrangement described in DE-A-34 32 090, a container is located from which ore is charged into the ore bin. Inert gas is injected into the connection between this container and the ore bin in order to prevent sulfur-bearing off-gas from exiting the ore bin through this connection. This measure thus serves to establish a gas seal.

An arrangement for cooling a gas-permeable bed of subsiding solid particles, for example, of reduced ore pellets, at the outlet of a reduction shaft furnace is known from AT-B-328 481.

Arrangements of this type are also known from DE-C-26 51 309 and U.S. Pat. No. 4,046,557. In these known arrangements, partly off-gas (waste reduction gas) from the reduction shaft furnace is used for cooling. These documents do not give any statements about the sealing of the reduction shaft furnace against the environment in order to prevent the gas contained in the reduction shaft furnace from exiting.

U.S. Pat. No. 4,212,452 describes a plant in which iron oxide is reduced to sponge iron in a shaft furnace through the addition of solid carbon-bearing material, which is gasified in an upper zone of the shaft furnace, and through the addition of reduction gas containing CO and $H_2$ in a central zone of the shaft furnace. The iron oxide, together with the solid carbon-bearing material, is charged from the top into the shaft furnace and flows through the shaft furnace from the top to the bottom, partly cocurrently and partly countercurrently to the reduction gases. In a lower zone of the shaft furnace, the sponge iron formed by reduction is cooled with cool, dry reduction gas. The shaft furnace is sealed towards the top and bottom with one $CO_2$-operated gas seal each in order to prevent the undesirable escape of reduction gas from the shaft furnace, $CO_2$ being recovered therein from waste reduction gas through gas scrubbing. This known arrangement has the disadvantage that the sealing gas, $CO_2$, may enter the shaft furnace, which is undesirable with regard to reduction.

An arrangement which is used, for example, for the direct reduction of iron-oxide-bearing material by means of reduction gas in a shaft furnace is known from U.S. Pat. No. 3,850,616. The iron-oxide-bearing material flows through the shaft furnace from the top to the bottom countercurrently to the reduction gas and is cooled with cool reduction gas in the lower zone of the shaft furnace. In order to prevent reduction gas from exiting the shaft furnace, a gas seal operated with inert gas is provided at the lower end of the shaft furnace. This known arrangement has the disadvantage of high consumption of expensive inert gas.

Processes in which iron-oxide-bearing material is reduced in a shaft furnace by means of reduction gas and melted in a melting unit which is structurally connected with the shaft furnace are known from U.S. Pat. No. 4,248,626 and U.S. Pat. No. 4,270,740. In the melting unit, reduction gas is generated by coal gasification.

The reduction gas is withdrawn from the melting unit and cooled before it is charged into the shaft furnace in order to prevent the material reduced in the shaft furnace from agglomerating. In order to prevent the very hot reduction gas from being carried over from the melting unit directly into the shaft furnace, a gas seal is provided in the direct connection between the melting unit and the shaft furnace.

The applicant knows that gas seals operated with nitrogen, which seal shaft furnaces against the environment, are customary. Gas seals of this type have the disadvantage that the generation of nitrogen involves high technical expenditure, which results in high costs because large amounts of nitrogen are consumed.

SUMMARY OF THE INVENTION

The technical problem of the present invention is to eliminate this disadvantage and to provide a reduction vessel of the type described above which can be sealed with a less expensive sealing gas.

According to the invention, at a reduction vessel for the reduction of metal-oxide-bearing material, particularly of iron ore, by means of a reduction gas flowing countercurrently to the metal-oxide-bearing material, which reduction vessel is provided with an inlet for the metal-oxide-bearing material, an inlet for the reduction gas, an outlet for off-gas and an outlet for reduced material, downstream of which outlet a lower sealing leg is connected, a supply line for a first sealing gas being provided at the lower sealing leg in order to seal the reduction vessel against the environment, the technical problem is solved by providing at least one additional supply line for an additional sealing gas at the lower sealing leg, the additional supply line being located downstream of the supply line for the first sealing gas, seen in the direction of flow of the reduced material.

Accordingly, at least one additional gas seal is provided at the reduction vessel according to the invention. This additional gas does not have to be inert to the reactions occurring in the reduction vessel, therefore a less expensive gas can be used. This gas assumes the function of the main sealing gas. The other gas seal, which is operated with a gas that is inert to the reactions occurring in the reduction vessel, for example, nitrogen or carbon dioxide, assumes the function of an auxiliary gas seal and also prevents the main sealing gas from entering the reduction vessel. In this way, considerably less inert gas is consumed than required according to prior art.

Off-gas from the reduction vessel can be used for operating the main gas seal. In this case, the off-gas outlet is connected to the lower sealing leg through a line at the reduction vessel according to the invention, wherein a burner is provided for combusting the off-gas and a cooling device is provided for cooling the off-gas combusted in the burner. Furthermore, a compressor is expediently provided, which is connected downstream of the cooling device.

Another preferred embodiment of the reduction vessel according to the invention is characterized in that a vessel for the metal-oxide-bearing material is connected to the reduction vessel through a line and that this connection is provided with a supply line for sealing gas for sealing the reduction vessel against the vessel for the metal-oxide-bearing material.

Another preferred embodiment is characterized in that at least one additional supply line for an additional sealing gas is provided at the connecting line of the vessel for the metal-oxide-bearing material to the reduction vessel, which additional supply line is connected to the supply line for additional sealing gas to the lower sealing leg.

The invention further relates to a process for sealing a reduction vessel in which metal-oxide-bearing material, particularly iron ore, is reduced by means of a reduction gas flowing countercurrently to the metal-oxide-bearing material and from which reduced material is discharged through an outlet and through a lower sealing leg connected downstream of the outlet, wherein gas that is inert to the chemical reactions occurring in the reduction vessel, with which a first gas seal is operated, which process is characterized in that an additional gas is used for sealing the reduction vessel against the environment, with which at least one additional gas seal is operated, which is located downstream of the first gas seal, seen in the direction of flow of the reduced material.

According to a preferred embodiment, this at least one additional gas seal can be operated with a gas generated from the off-gas of the reduction vessel, which is nearly stoichiometrically combusted and subsequently cooled before it is used as sealing gas. The additional gas is advantageously compressed after cooling.

After the nearly stoichiometric combustion and prior to cooling, the off-gas of the reduction vessel is post-combusted, if required. The additional gas is thereby preferably set to an oxygen content of max. 3 volume percent.

Another preferred embodiment of the process according to the invention is characterized in that the metal-oxide-bearing material is charged from a vessel into the reduction vessel, the reduction vessel being sealed against the vessel for metal-oxide-bearing material by means of a gas that is inert to the chemical reactions occurring in the reduction vessel, with which a gas seal is operated.

An additional gas is preferably used for sealing the reduction vessel against the vessel for the metal-oxide-bearing material, with which at least one additional gas seal is operated.

BRIEF DESCRIPTION OF THE DRAWINGS

Preferred embodiments of the invention are described in greater detail in the drawings, where the same reference symbols are used to designate the same plant parts.

DETAILED DESCRIPTION OF THE PREFERRED EMBODIMENTS

Figure 1:
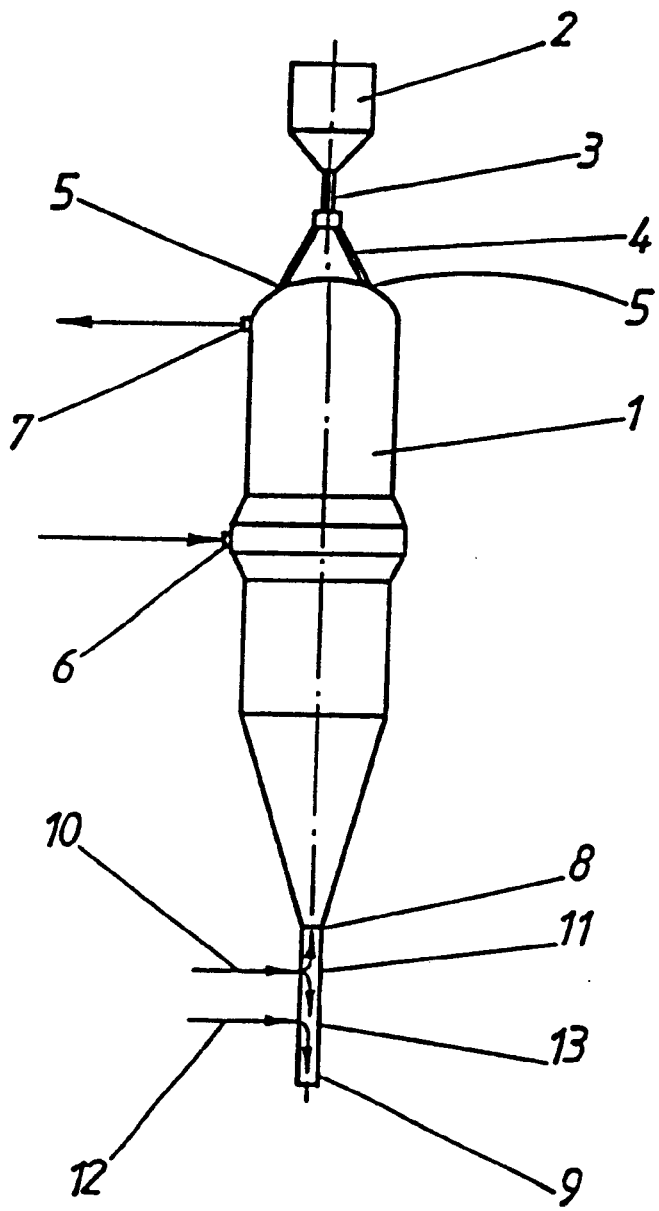
FIG. 1 schematically illustrates a reduction vessel according to the present invention.

In FIG. 1, reference numeral 1 designates a conventional shaft furnace as reduction vessel for the reduction of iron ore which is conveyed from vessel 2, which represents an ore bin, through sealing leg 3 and downpipes 4 through inlet 5 into shaft furnace 1.

Reduction gas is fed into shaft furnace 1 through inlet 6 and ascends countercurrently to the iron ore within shaft furnace 1. At the top, it exits shaft furnace 1 at outlet 7 in the form of off-gas (top gas) at a temperature of approx. 200–300° C., depending on the gas composition. The iron ore flows countercurrently to the reduction gas and is thereby reduced by the reduction gas. The reduced iron ore is discharged from shaft furnace 1 through outlet 8 and through lower sealing leg 9, which is connected downstream.

At lower sealing leg 9, supply line 10 for a first sealing gas is provided with which first gas seal 11 is operated. Nitrogen, for example, is used as first sealing gas in the way already known. Additional supply line 12 according to the invention is connected downstream, seen in the direction of flow of the reduced iron ore, for an additional sealing gas with which additional gas seal 13 is operated. According to the invention, a less expensive gas than nitrogen is used as additional sealing gas.

By means of the two gas seals, 11 and 13, shaft furnace 1 is sealed against the environment, i.e. the ambient atmosphere, so that any gas contained in shaft furnace 1 is prevented from exiting through outlet 8 and lower sealing leg 9.

Figure 2:
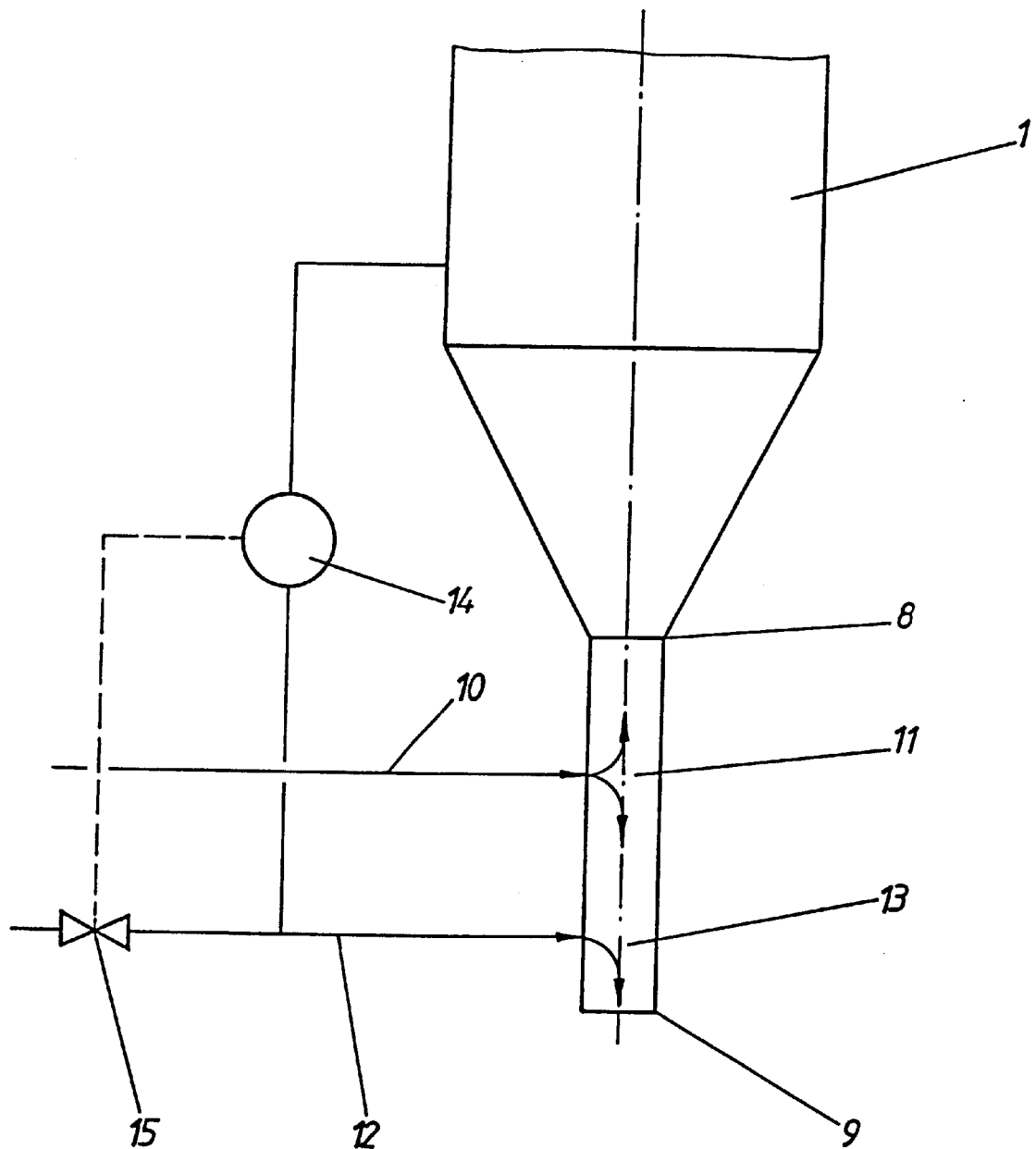
FIG. 2 schematically illustrates a detail of the reduction vessel.

The function of gas seals 11, 13 is explained in greater detail by means of FIG. 2. FIG. 2 shows part of FIG. 1 on an enlarged scale, the same plant parts being designated by the same reference symbols.

The additional sealing gas used according to the invention is pressed into lower sealing leg 9 through supply line 12. The sealing gas flows downwards in sealing leg 9, thus sealing shaft furnace 1 against the environment. In order to prevent the additional sealing gas from entering shaft furnace 1, nitrogen is pressed into sealing leg 9 through supply line 10 on the shaft furnace side. The arrows in FIG. 2 indicate the direction of flow of the nitrogen or of the additional sealing gas according to the invention.

In order to seal shaft furnace 1 against the environment, the pressure in supply line 12 is adjusted to the pressure prevailing in shaft furnace 1 upstream of its junction with lower sealing leg 9 by means of device 14 for differential pressure measurement in a way known to the specialist. It is obvious that the gas pressure in line 12 after passing by valve 15 must be higher than the pressure of the gas contained in shaft furnace 1. Device 14 for differential pressure measurement controls valve 15.

Additionally, the pressure in supply line 10 is set to a value ensuring that a local nitrogen gas cushion builds up in lower sealing leg 9 which effectively prevents the additional sealing gas from entering shaft furnace 1 so that the reduction processes occurring in shaft furnace 1 are not affected by the additional sealing gas.

Figure 3:
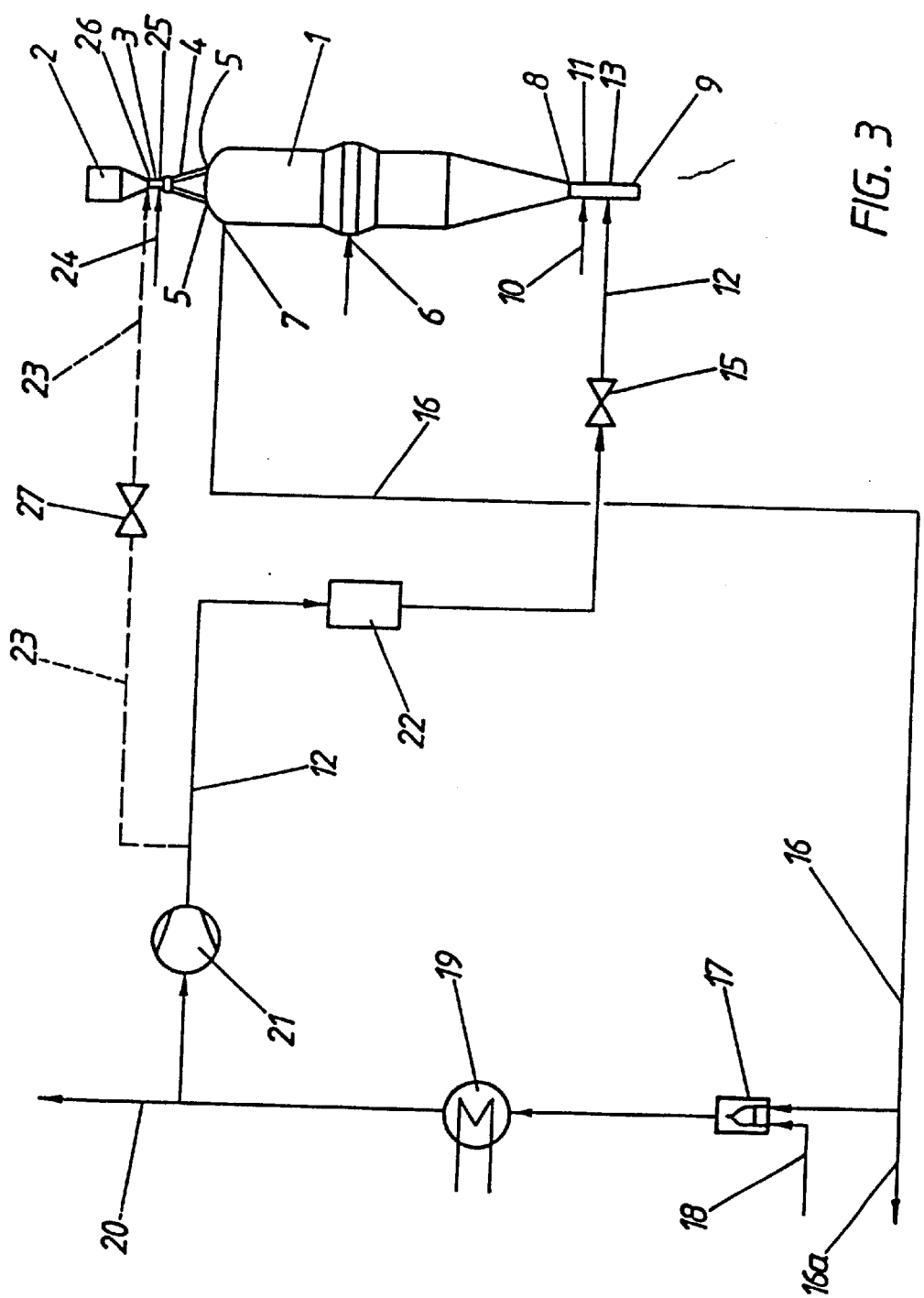
FIG. 3 schematically illustrates an arrangement including the reduction vessel.

According to a preferred embodiment of the invention, the additional sealing gas is generated from the off-gas of shaft furnace 1, as explained in greater detail by means of FIG. 3.

The off-gas exiting shaft furnace 1 at outlet 7 is conveyed at least partially through line 16 into burner 17, in which combustible constituents of the off-gas, such as CO, $H_2$ and $CH_4$, are combusted. Part of the waste reduction gas is discharged through line 16a, if required. Reference numeral 18 designates the supply of oxygenous combustion gas, e.g. air, to burner 17. Subsequently, the combusted gas, which has a temperature of approx. 1800° C., is cooled in cooling device 19 to a temperature of, e.g., approx. 30° C. Cooling device 19 may be a heat exchanger, a scrubber, etc.

Having passed through cooling device 19, part of the cooled gas is discharged through line 20 and the remaining part is compressed by means of compressor 21 and conveyed as sealing gas into lower sealing leg 9 through supply line 12. As a result of the compression, the temperature of the gas is slightly increased, e.g., to approx. 35° C., depending on cooling device 19.

The oxygen content of the sealing gas should be as low as possible in order to prevent reoxidation of the reduced iron ore which is discharged from shaft furnace 1 through lower sealing leg 9 and thereby passes through gas seal 13 which is operated with the additional sealing gas. For this reason, the off-gas of shaft furnace 1 is to be nearly stoichiometrically combusted in burner 17. Since stoichiometric combustion is not always easily achieved, post-combustion system 22 for off-gas can be provided in case of need.

According to another preferred embodiment of the invention, shaft furnace 1 is also sealed at its upper end against vessel 2 by means of combusted off-gas, as indicated by broken lines in FIG. 3.

From sealing gas supply line 12 to lower sealing leg 9, supply line 23 branches off to upper sealing leg 3. Furthermore, supply line 24 for nitrogen is provided at upper sealing leg 3, which supply line 24 for nitrogen leads into upper sealing leg 3 between supply line 23 and shaft furnace 1. In order to seal shaft furnace 1 at its upper end against vessel 2, gas seal 25 is operated with nitrogen and additional gas seal 26 is operated with the additional sealing gas.

The pressure in supply line 23 for the additional sealing gas is adjusted to the pressure prevailing in the upper part of the shaft furnace 1, as described above on the basis of lower sealing leg 9. After passing through valve 27, the gas pressure in supply line 23 must be higher than the pressure of the off-gas in the upper part of shaft furnace 1. Gas seal 25, which is operated with nitrogen, is analogously also used as auxiliary gas seal for gas seal 11 and is intended to effectively prevent combusted off-gas, which is used as main sealing gas, from entering shaft furnace 1.

Furthermore, oxygenous gas, e.g. air, can be used as main sealing gas for upper sealing leg 3.

What is claimed is:

1. Reduction vessel (1) for the reduction of metal oxide-bearing material by means of a reduction gas flowing countercurrently to the metal-oxide-bearing material, which reduction vessel (1) is provided with an inlet (5) for the metal-oxide-bearing material, an inlet (6) for the reduction gas, an outlet (7) for off-gas and an outlet (8) for reduced material, downstream of which outlet (8) a lower sealing leg (9) is connected, a supply line (10) for a first sealing gas being provided at the lower sealing leg (9) in order to seal the reduction vessel (1) against the environment, said reduction vessel being provided with at least one additional supply line (12) for an additional sealing gas at the lower sealing leg (9), the additional supply line (12) being located below the supply line (10) for the first sealing gas.

2. Reduction vessel according to claim 1, wherein the outlet (7) for offgas is connected with the lower sealing leg (9) by means of a connecting line (12; 16) and a burner (17) for the combustion of off-gas and a cooling device (19) for cooling the off-gas combusted in the burner (17) are provided in said connecting line.

3. Reduction vessel according to claim 2, characterized in that the cooling device (19) is a heat exchanger or a scrubber.

4. Reduction vessel according to claim 2, wherein a compressor (21) is provided in the connecting line (12; 16) downstream of the cooling device (19).

5. Reduction vessel according to claim 1, wherein a vessel (2) for the metal-oxide-bearing material is connected with a reduction vessel (1) via a sealing leg (3) by a downpipe (4) and, in the sealing leg (3) or downpipe (4), a supply line (24) for a sealing gas for sealing the reduction vessel (1) against the vessel (2) for the metal-oxide-bearing material is provided.

6. Reduction vessel according to claim 5, wherein at least one additional supply line (23) for an additional sealing gas is provided in the sealing leg (3) or downpipe (4) of the vessel (2) for the metal-oxide-bearing material to the reduction vessel (1), which additional supply line (23) is connected with the supply line (12) for additional sealing gas to the lower sealing leg (9).

* * * * *